US012771239B2

(12) United States Patent
Kovarik et al.

(10) Patent No.: US 12,771,239 B2
(45) Date of Patent: Oct. 20, 2026

(54) ACTIVE PRE-CHARGE CIRCUIT FOR AVIONICS LRUs

(71) Applicant: HONEYWELL INTERNATIONAL INC., Charlotte, NC (US)

(72) Inventors: Martin Kovarik, Brno (CZ); Ludek Handlir, Brno (CZ); Roman Kostka, Brno (CZ)

(73) Assignee: Honeywell Aerospace US LLC, Phoenix, AZ (US)

( * ) Notice: Subject to any disclaimer, the term of this patent is extended or adjusted under 35 U.S.C. 154(b) by 179 days.

(21) Appl. No.: 18/752,214

(22) Filed: Jun. 24, 2024

(65) Prior Publication Data

US 2025/0392207 A1 Dec. 25, 2025

(51) Int. Cl.
*H02M 1/36* (2007.01)
*H02M 1/44* (2007.01)
*H02M 3/158* (2006.01)

(52) U.S. Cl.
CPC ............... *H02M 1/36* (2013.01); *H02M 1/44* (2013.01); *H02M 3/158* (2013.01)

(58) Field of Classification Search
CPC ........... H02M 1/36; H02M 1/44; H02M 3/158
See application file for complete search history.

(56) References Cited

U.S. PATENT DOCUMENTS 5,580,469 A * 12/1996 Magara .................. B23H 1/022 219/69.18
6,744,644 B2 6/2004 Kojori
7,148,442 B2 * 12/2006 Murai ...................... B23H 7/04 219/69.13
7,307,407 B2 * 12/2007 Nishi .................... H02M 3/158 323/350

(Continued)

FOREIGN PATENT DOCUMENTS

CN 107482899 A 12/2017
CN 115765454 A 3/2023
EP 4145145 A1 3/2023

OTHER PUBLICATIONS

Allegro Microsystems, A81805 and A81805-1 40 V, 2.5 A, Synchronous Buck Regulator with Low EMI and 6 HA Quiescent Current Datasheet, Feb. 11, 2022.

*Primary Examiner* — Rafael O De Leon Domenech
(74) *Attorney, Agent, or Firm* — Ingrassia Fisher & Lorenz

(57) ABSTRACT

Electrical circuits and systems are provided for line replaceable units (LRUs) having an inductor shared between an electromagnetic interference (EMI) filtering stage and an inrush current limiting active pre-charge circuit. An exemplary circuit includes a first bus reference voltage node, a second bus reference voltage node, a switching element coupled between the first bus reference voltage node and a third node, a first diode coupled between the third node and the second bus reference voltage node to enable current from (Continued)

the second bus reference voltage node to the third node, at least one capacitive element coupled between a fourth node and the second bus reference voltage node, an inductive element coupled between the third node and the fourth node, and a second diode coupled between the fourth node and the first bus reference voltage node to enable current from the fourth node to the first bus reference voltage node.

20 Claims, 2 Drawing Sheets

(56) References Cited

U.S. PATENT DOCUMENTS

| | | | | |
|---|---|---|---|---|
| 7,330,018 | B2 * | 2/2008 | Huber | H02M 1/34<br>323/284 |
| 7,545,133 | B2 * | 6/2009 | Fujino | H02M 3/158<br>323/290 |
| 7,884,495 | B2 | 2/2011 | Kojori | |
| 9,160,228 | B1 | 10/2015 | Parker et al. | |
| 10,135,342 | B1 | 11/2018 | Yu | |
| 2003/0111982 | A1 * | 6/2003 | Watanabe | H02M 3/158<br>323/225 |
| 2009/0174382 | A1 | 7/2009 | Bucella et al. | |
| 2015/0251542 | A1 | 9/2015 | Mensah-Brown et al. | |
| 2017/0302162 | A1 * | 10/2017 | Green | H02M 5/42 |
| 2019/0241284 | A1 * | 8/2019 | Benward | G01R 27/04 |
| 2021/0167591 | A1 | 6/2021 | Pennam | |
| 2022/0103070 | A1 * | 3/2022 | Chen | H02M 3/04 |
| 2022/0173588 | A1 * | 6/2022 | Gajanayake | H02H 1/043 |
| 2023/0064503 | A1 * | 3/2023 | Chai | H02H 1/003 |
| 2023/0246875 | A1 | 8/2023 | Johannessen | |
| 2025/0125705 | A1 * | 4/2025 | Hu | H02M 7/145 |
| 2025/0364904 | A1 * | 11/2025 | Han | H02M 1/36 |

* cited by examiner

ACTIVE PRE-CHARGE CIRCUIT FOR AVIONICS LRUs

TECHNICAL FIELD

The subject matter described herein relates generally to vehicle systems, and more particularly, embodiments of the subject matter relate to active pre-charge circuitry for line replaceable units (LRUs) on a voltage bus.

BACKGROUND

Modern vehicles often include any number of different systems that support different functionality with respect to operation of the vehicle. In aircraft, these systems are typically implemented using line replaceable units (LRUs) that allow for modular components to be upgraded, swapped or replaced for maintenance purposes and to reduce downtime. Vertical take-off and landing (VTOL) aircraft or other aircraft non-conventional aircraft may include any number of different actuators or effectors implemented as LRUs arranged or distributed at various locations throughout the body of the aircraft and operated independently of one another to provide lift, propulsion, and/or attitude control for the aircraft (e.g., by operating a motor of the LRU to actuate propellers, lift fans, rotors, flight control surface actuators, and/or the like).

Many VTOL aircraft and other smaller aircraft, such as air taxis or other urban air mobility (UAM) vehicles, utilize a higher voltage power source to operate different actuators or effectors. Avionics LRUs designed for use with higher voltage power sources, such as motor controllers, must meet requirements for the electromagnetic compatibility (EMC) (e.g., to avoid interference with communications and/or navigation systems), while simultaneously being designed to minimize size, weight, form factor and/or the like. However, higher voltages typically require larger and heavier inductors and capacitors to mitigate voltage spikes, inrush currents, or other electrical phenomena while incorporating additional insulation, creepage distance, and the like. Accordingly, it is desirable to provide LRUs suitable for higher voltage applications that comply with EMC requirements while also minimizing the weight and associated costs. Other desirable features and characteristics will become apparent from the subsequent detailed description and the appended claims, taken in conjunction with the accompanying drawings and the foregoing technical field and background.

BRIEF SUMMARY

Electrical circuits and systems are provided for line replaceable units (LRUs) having an inductor shared between an electromagnetic interference (EMI) filtering stage and an inrush current limiting active pre-charge circuit. An exemplary circuit includes a first bus reference voltage node, a second bus reference voltage node, a switching element coupled between the first bus reference voltage node and a third node, a first diode coupled between the third node and the second bus reference voltage node to enable current from the second bus reference voltage node to the third node, at least one capacitive element coupled between a fourth node and the second bus reference voltage node, an inductive element coupled between the third node and the fourth node, and a second diode coupled between the fourth node and the first bus reference voltage node to enable current from the fourth node to the first bus reference voltage node.

In another embodiment, a LRU is provided that includes an input interface having a first reference voltage node and a second reference voltage node, a switching element coupled between the first reference voltage node and a third node, a first diode coupled between the third node and the second reference voltage node to enable current from the second reference voltage node to the third node, at least one capacitive element coupled between a fourth node and the second reference voltage node, an inductive element coupled between the third node and the fourth node, a second diode coupled between the fourth node and the first reference voltage node to enable current from the fourth node to the first reference voltage node, and control circuitry coupled to the switching element to deactivate the switching element based at least in part on a current through the inductive element.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF DRAWINGS

Exemplary embodiments of the subject matter of the present disclosure will hereinafter be described in conjunction with the following drawing figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to electrical systems and circuits suitable for use in line replaceable units (LRUs) or other modular electronic components to be coupled to a high voltage bus or other higher voltage power supply. For purposes of explanation, the subject matter is described herein primarily in the context of a motor controller or other LRU for operating an actuator or effector associated with an aircraft, such as a vertical take-off and landing (VTOL) aircraft, an urban air mobility (UAM) vehicle, or the like. That said, it should be appreciated the subject matter is not necessarily limited to use with aircraft or any other particular type of vehicle, system or application, and may be similarly utilized in other applications, systems or environments, including, but not limited to use with other types of vehicles (e.g., automobiles, marine vessels, trains, etc.).

The electrical systems and circuits described herein include an input electromagnetic interference (EMI) filter and a soft start circuit (or active pre-charge circuit) coupled to the EMI filter, wherein an inductor is shared between the EMI filter and the buck converter of the soft start circuit. By virtue of sharing the inductor, there may only be one relatively larger higher voltage inductor coupled to the higher voltage input, which saves space and reduces the overall weight of the LRU relative to other approaches including two or more higher voltage inductors without compromising electromagnetic compatibility (EMC) or other design requirements.

Figure 1:
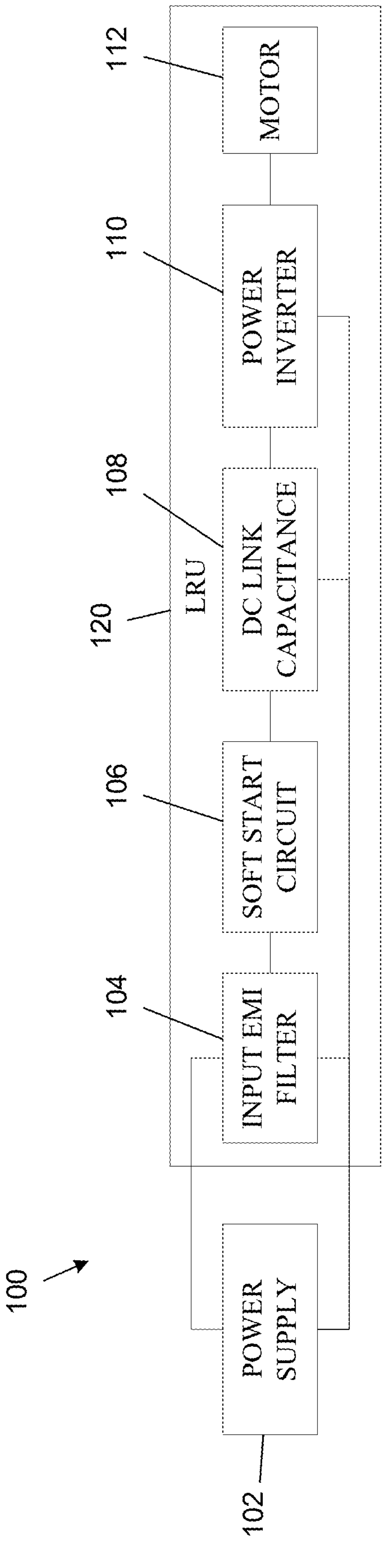
FIG. 1 is a block diagram of an electrical system suitable for use with an aircraft in accordance with one or more exemplary embodiments.

FIG. 1 depicts an exemplary embodiment of an electrical system 100 suitable for use with an avionics LRU 120 to be deployed onboard an aircraft. The LRU 120 includes an input EMI filter arrangement 104 having an input interface that is connected to or otherwise coupled to a power supply 102 providing direct current (DC) electrical power to the LRU 120. For example, in one or more exemplary embodiments, the power supply 102 is realized as a high voltage avionics bus having a nominal DC bus voltage in the range of about 270 Volts to about 1000 Volts or more. The input EMI filter 104 is coupled to a soft start circuit arrangement 106, which generally represents an active pre-charge circuit including a switching element arranged in series between the input EMI filter 104 and a DC link capacitance 108, where the switching element is switched, modulated or otherwise operated based on the input current to limit or otherwise mitigate the inrush current to the DC link capacitance 108. In this regard, the DC link capacitance 108 generally represents one or more capacitors coupled between reference voltage nodes associated with the LRU 120 to maintain a substantially constant DC voltage across the DC link capacitance 108 and minimize voltage and/or current ripple at the input to one or more downstream components.

In the illustrated implementation, the LRU 120 is realized as a motor controller or other actuator control module that includes a power conversion arrangement, such as a power inverter 110, that is coupled between the DC link capacitance 108 and an actuator, such as an electric motor 112, that is capable of being mechanically coupled to or otherwise configured to actuate a flight control component to influence the position and/or attitude of an aircraft. In this regard, one skilled in the art will appreciate the particular control scheme and other implementation details of the power inverter 110 and the electric motor 112 are not germane to the subject matter of this disclosure, and accordingly, will not be described in detail herein.

Figure 2:
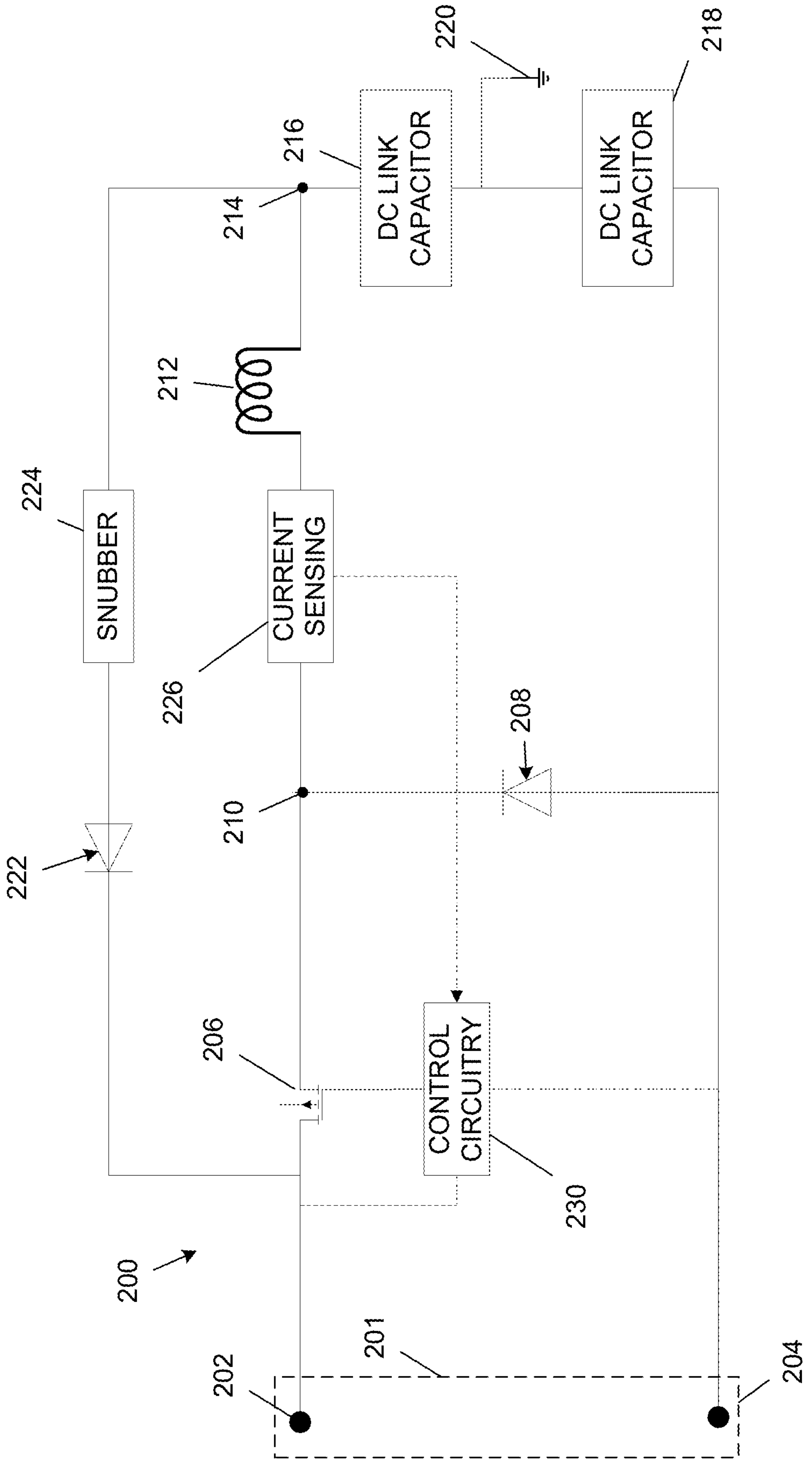
FIG. 2 is a schematic diagram of an electrical circuit suitable for use with a line replaceable unit (LRU) in the electrical system of FIG. 1 in one or more exemplary embodiments.

FIG. 2 depicts an exemplary implementation of an electrical circuit 200 suitable for use in an avionics LRU, such as the LRU 120, to electrically couple the DC link capacitance and/or the input of the power inverter of a motor controller to a high voltage power source, such as an avionics bus having a DC bus voltage of 800 Volts or more. The electrical circuit 200 includes an input interface 201, which generally represents the pins, connectors, terminals, ports or other input nodes associated with the electrical circuit 200 capable of being connected or otherwise coupled to an electrical cable or wiring for establishing an electrical connection between respective reference voltage nodes 202, 204 of the electrical circuit 200 and a power source, such as an avionics bus, a battery (or battery pack), a fuel cell, and/or the like. For example, in exemplary embodiments, the input interface 201 is configured to be coupled to an avionics bus to establish an electrical connection to the respective reference voltage nodes 202, 204 that results in a DC bus voltage between the positive bus reference voltage node 202 and the negative bus reference voltage node 204 of 270 Volts or more, and in some implementations, up to 800 Volts or more.

A switching element 206 is configured electrically in series between the positive bus reference voltage node 202 and a cathode of a freewheeling diode 208 at an intermediate node 210. An anode of the freewheeling diode 208 is coupled to the negative bus reference voltage node 204 such that the freewheeling diode 208 enables or otherwise allows current flow from the negative bus reference voltage node 204 to the intermediate node 210 when the voltage at the negative bus reference voltage node 204 is greater than the voltage at the intermediate node 210 by more than the threshold voltage of the diode 208. In exemplary implementations, the switching element 206 is realized as a field-effect transistor (FET); however, it should be appreciated that the subject matter is not necessarily limited to any particular type of switching element 206, and in practice, the subject matter described herein may be implemented in an equivalent manner utilizing a insulated-gate bipolar transistor (IGBT), a bipolar junction transistor (BJT), or another suitable type of electrical switch.

An inductor 212 or another suitable inductive element is configured electrically in series between the intermediate node 210 and a positive reference voltage node 214 that is configured to provide a positive reference supply voltage to the power inverter 110 or other downstream components of the LRU. In this regard, the illustrated implementation depicts an implementation of the DC link capacitance 108 that includes a first DC link capacitor 216 configured electrically in series between the positive reference voltage node 214 and an intermediate reference node 220 (e.g., a ground reference voltage node) and a second DC link capacitor 218 that is configured electrically in series between the negative bus reference voltage node 204 and the intermediate reference node 220, where the power supply input nodes of the power inverter 110 are respectively coupled to the positive reference voltage node 214 and the negative bus reference voltage node 204. As described in greater detail below, the switching element 206 is operated in concert with the inductor 212 and the freewheeling diode 208 as a buck converter to actively pre-charge the voltage at the positive reference voltage node 214 by progressively increasing the voltage at the positive reference voltage node 214 to be substantially equal to the voltage at the positive bus reference voltage node 202 over a period of time to limit the inrush current and/or voltage spikes at the positive reference voltage node 214.

A feedback diode 222 is configured electrically in series with a snubber 224 coupled between the positive reference voltage node 214 and the positive bus reference voltage node 202 to enable or otherwise allow current flow from the positive reference voltage node 214 through the snubber 224 and the feedback diode 222 to the positive bus reference voltage node 202 when the voltage at the positive reference voltage node 214 is greater than the voltage at the positive bus reference voltage node 202 by more than the threshold voltage of the diode 222. In this regard, in exemplary implementations, the feedback diode 222 and the snubber 224 are cooperatively configured with the inductor 212 and the DC link capacitor 216 to provide a stage of the input EMI filter 104 coupled to the input interface 201, with the snubber 224 being realized as a resistor-capacitor (RC) snubber having respective resistance and capacitance values that are configured to damp a resonant frequency caused by the combination of the inductor 212 and the DC link capacitor 216. Accordingly, the inductor 212 serves dual purposes and is shared between the input EMI filtering stage including the inductor 212, the DC link capacitor 216, the feedback diode 222 and the RC snubber 224, and the buck converter of the soft start (or active pre-charge) circuit including the switching element 206, the freewheeling diode 208 and the inductor 212.

To support soft start or active pre-charge of the voltage at the positive reference voltage node 214, the electrical circuit 200 includes control circuitry 230 that is coupled to a control terminal of the switching element 206 and configured to automatically operate the switching element 206 based on a measured input current flowing through the inductor 212 obtained via a current sensing arrangement 226 configured electrically in series with the inductor 212 between the intermediate node 210 and the positive reference voltage node 214. In this regard, the current sensing arrangement 226 may be realized as a current sense resistor or another suitable component or arrangement thereof for providing a signal to the control circuitry 230 indicative of the magnitude of electrical current flowing through the inductor 212. The control circuitry 230 generally represents the control logic or other hardware, software, and/or firmware components configured to support soft start operation of the switching element 206. In this regard, depending on the implementation, the control circuitry 230 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein.

In exemplary implementations, the control circuitry 230 is coupled to the respective bus reference voltage nodes 202, 204 and the current sensing arrangement 226 to control operation of the switching element 206 based on the measured voltage between the bus reference voltage nodes 202, 204 and the measured current flow through the inductor 212. In this regard, to provide soft start functionality or otherwise actively pre-charge the voltage at the positive reference voltage node 214, the control circuitry 230 verifies or otherwise confirms the voltage difference between the bus reference voltage nodes 202, 204 is less than an overvoltage threshold before automatically activating or otherwise enabling the switching element 206 for an initial duty cycle within an initial switching period associated with the switching element 206, thereby temporarily enabling current flow from the positive bus reference voltage node 202 to the positive reference voltage node 214 via the switching element 206 and the inductor 212, which, in turn, increases the voltage at the positive reference voltage node 214 (or reduces the difference between the voltage at the positive bus reference voltage node 202 and the positive reference voltage node 214). When the measured current flow through the inductor 212 indicated by the current sensing arrangement 226 is greater than or equal to a deactivation threshold (e.g., 6 Amperes), the control circuitry 230 automatically deactivates or otherwise disables the switching element 206 for the remainder of the switching period to prevent current flow from the positive bus reference voltage node 202 during the remainder of the switching period until the measured current flow through the inductor 212 falls below a reactivation threshold.

Thereafter, after verifying the duration of the switching period of time elapsed since prior activation of the switching element 206 corresponds to a switching frequency that is less than or equal to a maximum switching frequency associated with the switching element 206, to start the next switching period, the automatically activates or otherwise enables the switching element 206 for another duty cycle to temporarily enable current flow from the positive bus reference voltage node 202 to the positive reference voltage node 214 for a period of time before automatically deactivating or otherwise disabling the switching element 206 when the sensed current flow through the inductor 212 is greater than or equal to the deactivation threshold. In this manner, the control circuitry 230 may progressively or incrementally increase the duty cycle while maintaining the switching frequency below a maximum switching frequency of the switching element 206 until reaching a duty cycle of 100% over a series or sequence of switching periods to progressively increase the voltage at the positive reference voltage node 214 to be substantially equal to the voltage of the positive bus reference voltage node 202 while limiting any potential inrush current below the deactivation threshold for the switching element 206. In some implementations, the control circuitry 230 may be configured to maintain the switching element 206 deactivated until the sensed current through the inductor 212 is less than a reactivation threshold current.

In one exemplary implementation, where the power source coupled to the input interface 201 is realized as an avionics bus having a DC voltage of 270 V or more, the inductor 212 may have an inductance in the range of about 200 microhenries (μH) to about 2000 μH. For soft start operation, the control circuitry 230 automatically operates the switching element 206 with a dynamically variable switching frequency based on the measured current flow through the inductor 212 in relation to the respective deactivation and reactivation thresholds that is less than or equal to a maximum switching frequency associated with the switching element 206 (e.g., 60 kilohertz or less) and a dynamically varying duty cycle using a deactivation threshold for the current through the inductor 212 that maintains a current flow through the switching element 206 that is less than or equal to a maximum DC current threshold associated with the switching element 206 (e.g., 6 Amps) and is also less than or equal to a saturation current of the inductor 212. Additionally, it should be appreciated that although not illustrated in FIG. 2, in practice, the electrical circuit 200 may include one or more additional EMI filtering stages between the input interface 201 and the switching element 206, with the input EMI filtering stage including the inductor 212, the DC link capacitor 216, the feedback diode 222 and the RC snubber 224 being configured to operate in concert with the preceding EMI filtering stages to satisfy EMC requirements using the inductor 212 that is shared with the active pre-charge circuit to reduce the total size, weight and/or component costs associated with the electrical circuit 200 by using a fewer total number of inductors.

It should be noted that although FIG. 2 depicts an electrical circuit 200 including diodes 208, 222, in alternative implementations, the electrical circuit 200 may be implemented in an equivalent manner utilizing one or more transistors configured as a synchronous rectifier or other components configured to conduct electrical current in an equivalent manner. Moreover, it should be noted that although FIG. 2 depicts multiple DC link capacitors 216, 218 for purposes of explanation, in practical implementations, only one DC link capacitor may be present between the respective nodes 204, 214 coupled to the input of the power inverter 110 or other downstream component.

For the sake of brevity, conventional techniques related to avionics systems, electrical circuits, LRUs, EMC and/or EMI, RLC circuits, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A circuit comprising:

a first bus reference voltage node;

a second bus reference voltage node;

a switching element coupled between the first bus reference voltage node and a third node;

a first diode coupled between the third node and the second bus reference voltage node to enable current from the second bus reference voltage node to the third node;

at least one capacitive element coupled between a fourth node and the second bus reference voltage node;

an inductive element coupled between the third node and the fourth node;

a second diode coupled between the fourth node and the first bus reference voltage node to enable current from the fourth node to the first bus reference voltage node; and a snubber coupled between the first bus reference voltage node and the fourth node electrically in series with the second diode.

2. The circuit of claim 1, wherein the second diode disables current through the snubber when the switching element is closed and a voltage at the fourth node is less than a second voltage at the first bus reference voltage node.

3. The circuit of claim 1, further comprising control circuitry coupled to the switching element to toggle activation of the switching element based at least in part on a sensed current through the inductive element.

4. The circuit of claim 3, wherein the control circuitry toggles activation of the switching element at a variable switching frequency that is less than a maximum frequency of the switching element.

5. The circuit of claim 4, wherein the control circuitry dynamically increases a duty cycle associated with the activation of the switching element based at least in part on the sensed current through the inductive element.

6. The circuit of claim 3, wherein the control circuitry deactivates the switching element when the sensed current through the inductive element is greater than a threshold.

7. The circuit of claim 6, wherein the threshold is less than a saturation current of the inductive element.

8. The circuit of claim 6, wherein the control circuitry reactivates the switching element when the sensed current through the inductive element is less than a second threshold.

9. The circuit of claim 1, further comprising a power inverter coupled between the fourth node and the second bus reference voltage node.

10. A line replaceable unit (LRU) comprising:

an input interface comprising a first reference voltage node and a second reference voltage node;

a switching element coupled between the first reference voltage node and a third node;

a first diode coupled between the third node and the second reference voltage node to enable current from the second reference voltage node to the third node;

at least one capacitive element coupled between a fourth node and the second reference voltage node;

a power inverter coupled between the fourth node and the second reference voltage node;

an inductive element coupled between the third node and the fourth node;

a second diode coupled between the fourth node and the first reference voltage node to enable current from the fourth node to the first reference voltage node; and control circuitry coupled to the switching element to deactivate the switching element based at least in part on a current through the inductive element.

11. The LRU of claim 10, wherein the switching element, the first diode and the inductive element are configured as a buck converter.

12. The LRU of claim 11, wherein the second diode, the inductive element and the at least one capacitive element are configured as an electromagnetic interference filtering stage.

13. The LRU of claim 12, wherein the inductive element comprises a shared inductor between the buck converter and the electromagnetic interference filtering stage.

14. The LRU of claim 10, wherein the control circuitry reactivates the switching element with a variable switching frequency less than or equal to a maximum switching frequency of the switching element.

15. The LRU of claim 14, wherein the control circuitry associated with activation of the switching element based at least in part on the current through the inductive element.

16. The LRU of claim 10, wherein the control circuitry automatically deactivates the switching element when the current through the inductive element is greater than a threshold.

17. A line replaceable unit (LRU) comprising:

an input interface comprising a first reference voltage node and a second reference voltage node;

a switching element coupled between the first reference voltage node and a third node;

a first diode coupled between the third node and the second reference voltage node to enable current from the second reference voltage node to the third node;

at least one capacitive element coupled between a fourth node and the second reference voltage node;

an inductive element coupled between the third node and the fourth node;

a second diode coupled between the fourth node and the first reference voltage node to enable current from the fourth node to the first reference voltage node;

a snubber coupled between the fourth node and the first reference voltage node electrically in series with the second diode; and control circuitry coupled to the switching element to deactivate the switching element based at least in part on a current through the inductive element.

18. The LRU of claim 17, wherein the second diode disables current through the snubber when the switching element is closed and a voltage at the fourth node is less than a second voltage at the first reference voltage node.

19. A line replaceable unit (LRU) comprising:

an input interface comprising a first reference voltage node and a second reference voltage node;

a switching element coupled between the first reference voltage node and a third node;

a first diode coupled between the third node and the second reference voltage node to enable current from the second reference voltage node to the third node;

at least one capacitive element coupled between a fourth node and the second reference voltage node;

an inductive element coupled between the third node and the fourth node, wherein the switching element, the first diode and the inductive element are configured as a buck converter;

a second diode coupled between the fourth node and the first reference voltage node to enable current from the fourth node to the first reference voltage node, wherein the second diode, the inductive element and the at least one capacitive element are configured as an electromagnetic interference filtering stage; and control circuitry coupled to the switching element to deactivate the switching element based at least in part on a current through the inductive element.

20. The LRU of claim 19, wherein the inductive element comprises a shared inductor between the buck converter and the electromagnetic interference filtering stage.

* * * * *